(12) United States Patent
Lewis et al.

(10) Patent No.: US 10,159,964 B2
(45) Date of Patent: Dec. 25, 2018

(54) HIGH CHARGE DENSITY METALLOPHOSPHATE MOLECULAR SIEVES

(71) Applicant: UOP LLC, Des Plaines, IL (US)

(72) Inventors: Gregory J. Lewis, Santa Cruz, CA (US); Christopher P. Nicholas, Evanston, IL (US); Jaime G. Moscoso, Mount Prospect, IL (US); Seungwan Seo, Gyeongsangnam-do (KR); Junghwan Lee, Gyeonggi-do (KR); Suk Bong Hong, Nam-Gu (KR)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/586,503

(22) Filed: May 4, 2017

(65) Prior Publication Data

US 2017/0341064 A1    Nov. 30, 2017

Related U.S. Application Data

(60) Provisional application No. 62/341,190, filed on May 25, 2016.

(51) Int. Cl.
*C01B 39/54* (2006.01)
*B01J 29/84* (2006.01)
(Continued)

(52) U.S. Cl.
CPC .............. *B01J 29/84* (2013.01); *B01J 20/048* (2013.01); *B01J 20/3071* (2013.01);
(Continued)

(58) Field of Classification Search
CPC ........ C01B 39/54; C01P 2002/72; B01J 29/84; B01J 20/048
See application file for complete search history.

(56) References Cited

U.S. PATENT DOCUMENTS 4,310,440 A * 1/1982 Wilson ................ B01J 20/0292
                                                                  208/112
4,319,440 A   3/1982 Rassias et al.
(Continued)

FOREIGN PATENT DOCUMENTS

GB            2155916 A      10/1985

OTHER PUBLICATIONS

Feng et al. (Hydrothermal syntheses and structural characterization of zeolite analogue compounds based on cobalt phosphate, Nature, 1997, vol. 388, pp. 735-740). (Year: 1997).*

(Continued)

*Primary Examiner* — David M Brunsman

(57) ABSTRACT

A family of highly charged crystalline microporous metallophosphate molecular sieves designated PST-19 has been synthesized. These high charge density metallophosphates are represented by the empirical formula of:

$$R^{p+}{}_rA^+{}_mM^{2+}{}_xE_yPO_z$$

where A is an alkali metal such as potassium, R is an organoammonium cation such as tetraethylammonium, M is a divalent metal such as zinc and E is a trivalent framework element such as aluminum or gallium. The PST-19 family of materials are among the first MeAPO-type molecular sieves to be stabilized by combinations of alkali and quaternary ammonium cations, enabling unique compositions. The PST-19 family of molecular sieves has the SBS topology and catalytic properties for carrying out various hydrocarbon conversion processes and separation properties for separating at least one component.

16 Claims, 1 Drawing Sheet

(51) Int. Cl.

| | |
|---|---|
| *C10G 45/06* | (2006.01) |
| *B01J 20/04* | (2006.01) |
| *B01J 20/30* | (2006.01) |
| *B01J 37/00* | (2006.01) |
| *B01J 37/04* | (2006.01) |
| *B01J 37/06* | (2006.01) |
| *B01J 37/10* | (2006.01) |
| *B01J 39/02* | (2006.01) |
| *B01J 39/12* | (2006.01) |
| *C10G 45/04* | (2006.01) |
| *C10G 45/60* | (2006.01) |
| *C10G 47/12* | (2006.01) |
| *C10G 50/00* | (2006.01) |
| *C10K 3/02* | (2006.01) |
| *C10G 11/04* | (2006.01) |

(52) U.S. Cl.
CPC ....... *B01J 20/3078* (2013.01); *B01J 20/3085* (2013.01); *B01J 37/009* (2013.01); *B01J 37/04* (2013.01); *B01J 37/06* (2013.01); *B01J 37/10* (2013.01); *B01J 39/02* (2013.01); *B01J 39/12* (2013.01); *C01B 39/54* (2013.01); *C10G 11/04* (2013.01); *C10G 45/04* (2013.01); *C10G 45/06* (2013.01); *C10G 45/60* (2013.01); *C10G 47/12* (2013.01); *C10G 50/00* (2013.01); *C10K 3/02* (2013.01); *C01P 2002/72* (2013.01)

(56) References Cited

U.S. PATENT DOCUMENTS

| | | | | |
|---|---|---|---|---|
| 4,440,871 | A | * | 4/1984 | Lok .......... B01J 20/18 208/114 |
| 4,567,029 | A | * | 1/1986 | Wilson ........ B01J 27/18 208/114 |
| 4,801,364 | A | | 1/1989 | Wilson et al. |
| 4,853,197 | A | * | 8/1989 | Wilson ........ B01J 29/85 423/306 |
| 4,870,222 | A | | 9/1989 | Bakas et al. |
| 4,973,785 | A | | 11/1990 | Lok et al. |
| 5,126,120 | A | | 6/1992 | Bedard |
| 5,126,308 | A | | 6/1992 | Barger et al. |
| 5,152,972 | A | | 10/1992 | Gier |
| 5,157,196 | A | | 10/1992 | Crossland et al. |
| 5,157,197 | A | | 10/1992 | Cooper et al. |
| 5,302,362 | A | * | 4/1994 | Bedard .......... C01B 39/54 423/306 |
| 5,879,655 | A | | 3/1999 | Miller et al. |
| 6,207,872 | B1 | | 3/2001 | Barger et al. |
| 6,540,970 | B1 | | 4/2003 | Strohmaier et al. |
| 6,776,975 | B2 | | 8/2004 | Wilson et al. |
| 7,341,706 | B2 | | 3/2008 | Fuglerud et al. |
| 7,341,707 | B2 | | 3/2008 | Fuglerud et al. |
| 7,578,993 | B2 | | 8/2009 | Lewis et al. |
| 8,696,886 | B1 | | 4/2014 | Lewis et al. |
| 8,697,927 | B1 | | 4/2014 | Lewis et al. |
| 8,871,177 | B2 | | 10/2014 | Lewis et al. |
| 8,871,178 | B2 | | 10/2014 | Lewis et al. |
| 8,936,776 | B2 | * | 1/2015 | Lewis ............ C01B 39/54 423/277 |
| 2012/0004485 | A1 | | 1/2012 | Jan et al. |
| 2012/0189518 | A1 | | 7/2012 | Andersen et al. |
| 2014/0079616 | A1 | | 3/2014 | Fedeyko et al. |

OTHER PUBLICATIONS

Park et.al., Synthesis of aluminosilicate and gallosilicate zeolites via a charge density mismatch approach and their characterization, Journal of the American Chemical Society, 2011, 133 (6), pp. 1917-1934.

Park et.al., Formation pathway for LTA zeolite crystals synthesized via a charge density mismatch approach, Journal of the American Chemical Society, 135 (6), pp. 2248-2255.

Moteki et al., From charge density mismatch to a simplified, more efficient seed-assisted synthesis of UZM-4, Chemistry of Materials, 2013, 25 (13), pp. 2603-2609.

Meng et.al, Green Routes for Synthesis of Zeolites, Chemical Review 2014, 114, 1521-1543.

Lee et. al., From Synthesis and characterization of ERI-type UZM-12 zeolites and their methanol-to-olefin performance, Journal of the American Chemical Society, 2010, 132 (37), pp. 12971-12982.

Broach et.al., New ABC-6 net molecular sieves ZnAPO-57 and ZnAPO-59: Framework charge density-induced transition from two- to three-dimensional porosity, Microporous and Mesoporous Materials, 189, 2014, 49-63.

Harrison et.al.,Structures and Properties of New Zeolite X-Type Zincophosphate and Beryllophosphate Molecular Sieves, Chem. Mater., Mar. 27-29, 1991.

Patinec et.al., The Use of Triquaternary Alkylammonium Ions in the Synthesis of STA-5, a Magnesioaluminophosphate with the BPH Framework Topology, Chem. Mater. Nov. 1999, 2456-2462.

Bu et.al., Large-Cage Zeolite Structures with Multidimensional 12-Ring Channels, Science, 1997, 278, 2080.

Harrison et.al., Organic templates in zincophosphate synthesis: Zn5(PO4)2(HPO4)4?H2O?2H2N2C6H12, containing two distinct eight-ring channels and Zn3(PO4)(HPO4)2? HN2C6H12, containing tetrahedral three-rings and Zn?N bonds, Journal of Materials Chemistry, Feb. 1992 (11):1127-1134.

Feng et.al., Hydrothermal syntheses and structural characterization of zeolite analogue compounds based on cobalt phosphate, Nature, 1997 388(6644):735-741.

Gatter, Stability of Framework Aluminum in the New Zeolite UZM-5, Surface Science, (2004) vol. 154, p. 1324-1331.

PCT Search Report dated Aug. 14, 2017 for corresponding PCT Application No. PCT/US2017/030025.

* cited by examiner

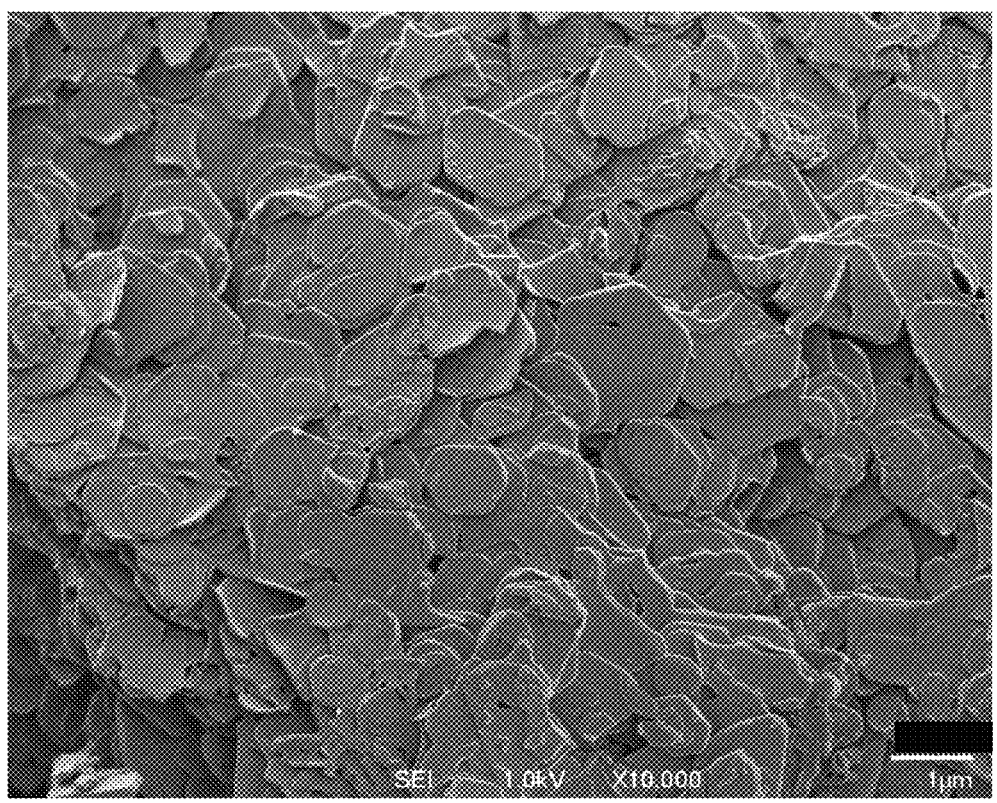

HIGH CHARGE DENSITY METALLOPHOSPHATE MOLECULAR SIEVES

CROSS-REFERENCE TO RELATED APPLICATION

This application claims priority from Provisional Application No. 62/341,190 filed May 25, 2016, the contents of which cited application are hereby incorporated by reference in its entirety.

FIELD OF THE INVENTION

This invention relates to a family of high charge density metallophosphate-based molecular sieves designated PST-19. They are represented by the empirical formula of:

$$R^{p+}_r A^+_m M^{2+}_x E_y PO_z$$

where A is an alkali metal such as potassium, R is a quaternary organoammonium cation such as tetraethylammonium, M is a divalent metal such as zinc and E is a trivalent framework element such as aluminum or gallium. The PST-19 family of materials has the SBS topology and crystal dimensions on the order of a few microns or less.

BACKGROUND OF THE INVENTION

Zeolites are crystalline aluminosilicate compositions which are microporous and which are formed from corner sharing $[AlO_{4/2}]^-$ and $SiO_{4/2}$ tetrahedra. Numerous zeolites, both naturally occurring and synthetically prepared are used in various industrial processes. Synthetic zeolites are prepared via hydrothermal synthesis employing suitable sources of Si, Al and structure directing agents (SDAs) such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces of the zeolite as well as on internal surfaces within the pores of the zeolite.

In 1982, Wilson et al. developed aluminophosphate molecular sieves, the so-called AlPOs, which are microporous materials that have many of the same properties of zeolites, but are silica free, composed of $[AlO_{4/2}]^-$ and $[PO_{4/2}]^+$ tetrahedra (See U.S. Pat. No. 4,319,440). Subsequently, charge was introduced to the neutral aluminophosphate frameworks via the substitution of $SiO_{4/2}$ tetrahedra for $[PO_{4/2}]^+$ tetrahedra to produce the SAPO molecular sieves (See U.S. Pat. No. 4,440,871). Another way to introduce framework charge to neutral aluminophosphates is to substitute $[M^{2+}O_{4/2}]^{2-}$ tetrahedra for $[AlO_{4/2}]^-$ tetrahedra, which yield the MeAPO molecular sieves (see U.S. Pat. No. 4,567,029). It is furthermore possible to introduce framework charge on AlPO-based molecular sieves via the introduction both of $SiO_{4/2}$ and $[M^{2+}O_{4/2}]^{2-}$ tetrahedra to the framework, giving MeAPSO molecular sieves (See U.S. Pat. No. 4,973,785).

In the early 1990's, high charge density molecular sieves, similar to the MeAPOs but without the Al, were developed by Bedard (See U.S. Pat. No. 5,126,120) and Gier (See U.S. Pat. No. 5,152,972). These metal phosphates (sometimes arsenates, vanadates) were based on $M^{2+}$ (M=Zn, Co), the general formula of which, in terms of the T-atoms, $T^{2+}$-$T^{5+}$, was approximately $A^+T^{2+}T^{5+}O_4$, having framework charge densities similar to Si/Al=1 zeolites and were charge balanced by alkali cations, $A^+$, in the pores. Later attempts to prepare metallophosphates of similar compositions but with organic SDAs led to porous, but interrupted structures, i.e., the structures contained terminal P—O—H and Zn—N bonds (See J. Mater. Chem., 1992, 2(11), 1127-1134.) Attempts at Al substitution in a zincophosphate network was carried out in the presence of both alkali and organoammonium agents, specifically the most highly charged organoammonium species, tetramethylammonium, but because of the high framework charge density, only the alkali made it into the pores to balance framework charge (See U.S. Pat. No. 5,302,362). Similarly, in a high charge density zincophosphate system that yielded the zinc phosphate analog of zeolite X, the synthesis in the presence of $Na^+$ and $TMA^+$ yielded a product that contained very little of the $TMA^+$ (See Chem. Mater., 1991, 3, 27-29).

To bridge the rather large charge density gap between the MeAPOs of U.S. Pat. No. 4,567,029 and the aforementioned alkali-stabilized $Me^{2+}$-phosphates of Bedard and Gier, Stucky's group developed a synthesis route using amines, often diamines, in ethylene glycol. They were able to make high charge density, small pore MeAPOs in which the concentrations of $Co^{2+}$ and $Al^{3+}$ in $R(Co_xAl_{1-x})PO_4$ were varied such that $0.33 \leq x \leq 0.9$ in the so-called ACP series of materials, the aluminum cobalt phosphates (See Nature, 1997, 388, 735). Continuing with this synthesis methodology utilizing ethylene glycol-based reaction mixtures and matching the amines to framework charge densities for $R(M^{2+}_xAl_{1-x})PO_4$, such that $0.4 \leq x \leq 0.5$, ($M^{2+}$=$Mg^{2+}$, $Mn^{2+}$, $Zn^{2+}$, $Co^{2+}$), the large pore materials UCSB-6, -8 and -10 were isolated (See Science, 1997, 278, 2080). Similarly, this approach also yielded MeAPO analogs of zeolite rho of the composition where $RM^{2+}_{0.5}Al_{0.5}PO_4$, where R=N,N'-diisopropyl-1,3-propanediamine, $M^{2+}$=$Mg^{2+}$, $Co^{2+}$ and $Mn^{2+}$. The reliance of this synthesis approach on an ethylene glycol solvent does not lend itself well to industrial scale, from both a safety and environmental point of view. While several others embraced Stucky's approach, there has been little activity in this intermediate charge density region, where $0.2 \leq x \leq 0.9$ for the $[M^{2+}_xAl_{1-x}PO_4]^{x-}$ compositions.

Pursuing aqueous chemistry, Wright et al. used highly charged triquaternary ammonium SDAs to make new MeAPO materials (See Chem. Mater., 1999, 11, 2456-2462). One of these materials, STA-5 with the BPH topology, ($Mg_{2.1}Al_{11.9}P_{14}O_{28}$), exhibited significant substitution of $Mg^{2+}$ for $Al^{3+}$, up to about 15%, but less substitution than seen in Stucky's non-aqueous ethylene glycol approach.

More recently, Lewis et al. developed aqueous solution chemistry using quaternary ammonium cations leading to high charge density SAPO, MeAPO, and MeAPSO materials, enabling greater substitution of $SiO_{4/2}$ and $[M^{2+}O_{4/2}]^{2-}$ into the framework for $[PO_{4/2}]^+$ and $[AlO_{4/2}]^-$, respectively, using the ethyltrimethylammonium ($ETMA^+$) and diethyldimethylammonium ($DEDMA^+$) SDAs. These materials include ZnAPO-57 (U.S. Pat. No. 8,871,178), ZnAPO-59 (U.S. Pat. No. 8,871,177), ZnAPO-67 (U.S. Pat. No. 8,697,927), and MeAPSO-64 (U.S. Pat. No. 8,696,886). The relationship between the increasing product charge densities and reaction parameters, namely the ETMAOH(DED- MAOH)/H$_3$PO$_4$ ratios, were outlined in the literature (See Microporous and Mesoporous Materials, 189, 2014, 49-63). The incorporation of M$^{2+}$ observed in these systems was such that for the formulation [M$^{2+}_x$Al$_{1-x}$PO$_4$]$^{x-}$, x~0.2-0.3.

Applicants have now synthesized a new family of highly charged metallophosphate framework materials, designated PST-19, with higher charge densities than the MeAPOs of U.S. Pat. No. 4,567,029 and the ZnAPO materials isolated by Lewis. These metallophosphates are prepared from aqueous solution utilizing a combination quaternary ammonium and alkali cations. The PST-19 materials have the SBS topology (See Database of Zeolite Structures, www.iza-structure.org/databases) and have higher metal content than reported for the SBS topology material UCSB-6, in which the maximum metal incorporation observed was 45% replacement of Al$^{3+}$ with Co$^{2+}$ (See Science, 1997, 278, 2080). Further distinguishing this work from that of Stucky is that aqueous solutions are employed here; free of ethylene glycol solvent and dipropylamine or diisopropylamine co-solvents used in the synthesis of UCSB-6. The approach used here produces PST-19 crystals with micron to submicron dimensions while the UCSB-6 materials exhibit gigantic crystal dimensions by comparison ranging from 150 to 600 The utility of alkali in MeAPO-based systems is uncommon and in combination with quaternary ammonium cations under the right conditions enables this system to achieve the charge densities and desired midrange compositions between the low charge density MeAPOs of U.S. Pat. No. 4,567,029 and high charge density M$^{2+}$-phosphate extremes of Bedard and Gier.

SUMMARY OF THE INVENTION

As stated, the present invention relates to a new family of metallophosphate molecular sieves designated PST-19. Accordingly, one embodiment of the invention is a microporous crystalline material having a three-dimensional framework of [M$^{2+}$O$_{4/2}$]$^{2-}$, [EO$_{4/2}$]$^-$ and [PO$_{4/2}$]$^+$ tetrahedral units and an empirical composition in the as synthesized form and anhydrous basis expressed by an empirical formula of:

$$R^{p+}_r A^+_m M^{2+}_x E_y PO_z$$

where R is at least one quaternary ammonium cation selected from the group consisting of tetraethylammonium (TEA$^+$), triethylpropylammonium (TEPA$^+$), diethylmethylpropylammonium (DEMPA$^+$), dimethylethylpropylammonium (DMEPA$^+$), dimethyldipropylammonium (DMDPA$^+$), methyltriethylammonium (MTEA$^+$), ethyltrimethylammonium (ETMA$^+$), diethyldimethylammonium (DEDMA$^+$), choline, hexamethonium (HM$^{2+}$), propyltrimethylammonium (PTMA$^+$), butyltrimethylammonium (BTMA$^+$), hexamethonium tetramethylammonium (TMA$^+$), tetrapropylammonium (TPA$^+$) and mixtures thereof, "r" is the mole ratio of R to P and has a value of about 0.04 to about 1.0, "p" is the weighted average valence of R and varies from 1 to 2, A is an alkali metal such as Li$^+$, Na$^+$, K$^+$, Rb$^+$ and Cs$^+$ and mixtures thereof, "m" is the mole ratio of A to P and varies from 0.1 to 1.0, M is a divalent element selected from the group of Zn, Mg, Co, Mn and mixtures thereof, "x" is the mole ratio of M to P and varies from 0.2 to about 0.9, E is a trivalent element selected from the group consisting of aluminum and gallium and mixtures thereof, "y" is the mole ratio of E to P and varies from 0.1 to about 0.8 and "z" is the mole ratio of O to P and has a value determined by the equation:

$$z=(m+p \cdot r+2 \cdot x+3 \cdot y+5)/2$$

and is characterized in that it has the x-ray diffraction pattern having at least the d-spacings and intensities set forth in Table A:

TABLE A

| 2Θ | d (Å) | I/I$_0$ % |
|---|---|---|
| 6.01-5.72 | 14.70-15.45 | w-m |
| 6.80-6.37 | 12.98-13.87 | vs |
| 10.22-9.94 | 8.65-8.89 | w |
| 12.22-11.87 | 7.24-7.45 | w |
| 13.30-12.99 | 6.65-6.81 | w |
| 15.62-15.18 | 5.67-5.83 | w |
| 15.86-15.52 | 5.585-5.705 | w |
| 16.75-16.40 | 5.29-5.40 | w |
| 20.35-19.89 | 4.36-4.46 | w-m |
| 21.29-20.69 | 4.17-4.29 | w |
| 22.09-21.77 | 4.02-4.08 | w-m |
| 24.30-23.84 | 3.66-3.73 | w |
| 37.12-25.43 | 2.42-3.50 | w-m |
| 27.00-26.51 | 3.30-3.36 | w-m |
| 28.59-28.22 | 3.12-3.16 | w-m |
| 29.46-28.97 | 3.03-3.08 | w-m |
| 31.48-31.03 | 2.84-2.88 | w-m |
| 35.52-35.02 | 2.525-2.56 | w |

Another embodiment of the invention is a process for preparing the crystalline metallophosphate molecular sieve described above. The process comprises forming a reaction mixture containing reactive sources of R, A, M, E and P and heating the reaction mixture at a temperature of about 60° C. to about 200° C. for a time sufficient to form the molecular sieve, the reaction mixture having a composition expressed in terms of mole ratios of the oxides of:

$$aR_{2/p}O:bA_2O:cMO:E_2O_3:dP_2O_5:eH_2O$$

where "a" has a value of about 2.1 to about 100, "b" has a value of about 0.1 to about 8.0, "c" has a value of about 0.25 to about 8, "d" has a value of about 1.69 to about 25, and "e" has a value from 30 to 5000.

Yet another embodiment of the invention is a hydrocarbon conversion process using the above-described molecular sieve as a catalyst. The process comprises contacting at least one hydrocarbon with the molecular sieve at conversion conditions to generate at least one converted hydrocarbon.

Still another embodiment of the invention is a separation process using the crystalline PST-19 material. The process may involve separating mixtures of molecular species or removing contaminants by contacting a fluid with the PST-19 molecular sieve. Separation of molecular species can be based either on the molecular size (kinetic diameter) or on the degree of polarity of the molecular species. Removing contaminants may be by ion exchange with the molecular sieve.

BRIEF DESCRIPTION OF THE DRAWING

The FIGURE shows an analysis of the product by SEM.

DETAILED DESCRIPTION OF THE INVENTION

Applicants have prepared a family of high charge density crystalline microporous metallophosphate compositions with the SBS topology, designated PST-19. Compared to other early MeAPO materials, the PST-19 family of materials contains more M$^{2+}$ and exhibits high framework (FW) charge densities that, unlike the other MeAPOs, use of alkali cations in addition to organoammonium ions to balance the FW charge. The instant microporous crystalline material (PST-19) has an empirical composition in the as-synthesized form and on an anhydrous basis expressed by the empirical formula:

$$R^{p+}_r A^+_m M^{2+}_x E_y PO_z$$

where A is at least one alkali cation and is selected from the group of alkali metals. Specific examples of the A cations include but are not limited to lithium, sodium, potassium, rubidium, cesium and mixtures thereof. R is at least one quaternary ammonium cation, examples of which include but are not limited to tetraethylammonium (TEA$^+$), triethylpropylammonium (TEPA$^+$), diethylmethylpropylammonium (DEMPA$^+$), dimethylethylpropylammonium (DMEPA$^+$), dimethyldipropylammonium (DMDPA$^+$), methyltriethylammonium (MTEA$^+$), ethyltrimethylammonium (ETMA$^+$), choline, diethyldimethylammonium (DEDMA$^+$), propyltrimethylammonium (PTMA$^+$), butyltrimethylammonium (BTMA$^+$), hexamethonium (HM$^{2+}$), tetramethylammonium (TMA$^+$), tetrapropylammonium (TPA$^+$) and mixtures thereof, and "r" is the mole ratio of R to P and varies from about 0.04 to about 1.0, while "p" is the weighted average valence of R and varies from about 1 to 2. M and E are tetrahedrally coordinated and in the framework, M is a divalent element selected from the group of Zn, Mg, Co, Mn and mixtures thereof, while E is a trivalent element selected from aluminum and gallium and mixtures thereof. In PST-19, it is also possible for a portion of M$^{2+}$ to be located in the pore, balancing FW charge. The value of "m" is the mole ratio of A to P and varies from 0.1 to about 1.0, "x" is mole ratio of M to P and varies from 0.2 to about 0.9, while the ratio of E to P is represented by "y" which varies from about 0.10 to about 0.8. Lastly, "z" is the mole ratio of 0 to P and is given by the equation:

$$z = (m + r \cdot p + 2 \cdot x + 3 \cdot y + 5)/2.$$

When only one type of R organoammonium cation is present, then the weighted average valence is just the valence of that cation, e.g., +1 or +2. When more than one R cation is present, the total amount of R is given by the equation:

$$R_r^{p+} = R_{r1}^{(p1)+} + R_{r2}^{(p2)+} + R_{r3}^{(p3)+} + \ldots$$

the weighted average valence "p" is given by:

$$p = \frac{r1 \cdot p1 + r2 \cdot p2 + r3 \cdot p3 + \ldots}{r1 + r2 + r3 + \ldots}$$

It has also been noted that in the PST-19 materials of this invention that a portion of M$^{2+}$ may also reside in the pores, likely in a charge balancing role.

The microporous crystalline metallophosphate PST-19 is prepared by a hydrothermal crystallization of a reaction mixture prepared by combining reactive sources of R, A, E, phosphorous and M. A preferred form of the PST-19 materials is when E is Al. The sources of aluminum include but are not limited to aluminum alkoxides, precipitated aluminas, aluminum metal, aluminum hydroxide, aluminum salts, alkali aluminates and alumina sols. Specific examples of aluminum alkoxides include, but are not limited to aluminum tri-sec-butoxide and aluminum tri-isopropoxide. Sources of phosphorus include, but are not limited to, orthophosphoric acid, phosphorus pentoxide, and ammonium dihydrogen phosphate. Sources of M include but are not limited to zinc acetate, zinc chloride, cobalt acetate, cobalt chloride, magnesium acetate, magnesium nitrate, manganese sulfate, manganese acetate and manganese nitrate. Sources of gallium, the other E element, include but are not limited to precipitated gallium hydroxide, gallium chloride, gallium sulfate or gallium nitrate. Sources of the A metals include the halide salts, nitrate salts, hydroxide salts, acetate salts, and sulfate salts of the respective alkali metals. R is at least one quaternary ammonium cation selected from the group consisting of tetraethylammonium (TEA$^+$), triethylpropylammonium (TEPA$^+$), diethylmethylpropylammonium (DEMPA$^+$), dimethylethylpropylammonium (DMEPA$^+$), dimethyldipropylammonium (DMDPA$^+$), methyltriethylammonium (MTEA$^+$), ethyltrimethylammonium (ETMA$^+$), diethyldimethylammonium (DEDMA$^+$), choline, propyltrimethylammonium (PTMA$^+$), butyltrimethylammonium (BTMA$^+$), hexamethonium (HM$^{2+}$), tetramethylammonium (TMA$^+$), tetrapropylammonium (TPA$^+$) and mixtures thereof, and the sources include the hydroxide, acetate, chloride, bromide, iodide and fluoride compounds. Specific examples include without limitation tetraethylammonium hydroxide, triethylpropylammonium hydroxide, diethylmethylpropylammonium hydroxide, dimethylethylpropylammonium hydroxide, dimethyldipropylammonium hydroxide, methyltriethylammonium hydroxide, hexamethonium dihydroxide, hexamethonium dichloride, choline hydroxide, choline chloride, propyltrimethylammonium hydroxide, propyltrimethylammonium chloride, tetrapropylammonium hydroxide and tetramethylammonium chloride. In one embodiment R is TEA$^+$. In another embodiment, R is triethylpropylammonium. In yet another embodiment, R is dimethylethylpropylammonium. In another embodiment, R is diethylmethylpropylammonium. In yet another embodiment, R is dimethyldipropylammonium. Finally, in another embodiment, R is methyltriethylammonium.

The reaction mixture containing reactive sources of the desired components can be described in terms of molar ratios of the oxides by the formula:

$$aR_{2/p}O : bA_2O : cMO : E_2O_3 : dP_2O_5 : eH_2O$$

where "a" varies from about 2.1 to about 100, "b" varies from about 0.1 to about 8, "c" varies from about 0.25 to about 8, "d" varies from about 1.69 to about 25, and "e" varies from 30 to 5000. If alkoxides are used, it is preferred to include a distillation or evaporative step to remove the alcohol hydrolysis products. The reaction mixture is now reacted at a temperature of about 60° C. to about 200° C. and preferably from about 95° C. to about 175° C. for a period of about 1 day to about 3 weeks and preferably for a time of about 1 day to about 7 days in a sealed reaction vessel at autogenous pressure. After crystallization is complete, the solid product is isolated from the heterogeneous mixture by means such as filtration or centrifugation, washed with de-ionized water and dried in air at ambient temperature up to about 100° C. PST-19 seeds can optionally be added to the reaction mixture in order to accelerate or otherwise enhance the formation of the desired microporous composition.

The PST-19 metallophosphate-based material, which is obtained from the above-described process, is characterized by the powder x-ray diffraction pattern, having at least the d-spacings and relative intensities set forth in Table A below.

TABLE A

| 2Θ | d (Å) | I/I$_0$ % |
|---|---|---|
| 6.01-5.72 | 14.70-15.45 | w-m |
| 6.80-6.37 | 12.98-13.87 | vs |
| 10.22-9.94 | 8.65-8.89 | w |

TABLE A-continued

| 2Θ | d (Å) | I/I₀ % |
|---|---|---|
| 12.22-11.87 | 7.24-7.45 | w |
| 13.30-12.99 | 6.65-6.81 | w |
| 15.62-15.18 | 5.67-5.83 | w |
| 15.86-15.52 | 5.585-5.705 | w |
| 16.75-16.40 | 5.29-5.40 | w |
| 20.35-19.89 | 4.36-4.46 | w-m |
| 21.29-20.69 | 4.17-4.29 | w |
| 22.09-21.77 | 4.02-4.08 | w-m |
| 24.30-23.84 | 3.66-3.73 | w |
| 37.12-25.43 | 2.42-3.50 | w-m |
| 27.00-26.51 | 3.30-3.36 | w-m |
| 28.59-28.22 | 3.12-3.16 | w-m |
| 29.46-28.97 | 3.03-3.08 | w-m |
| 31.48-31.03 | 2.84-2.88 | w-m |
| 35.52-35.02 | 2.525-2.56 | w |

The PST-19 may be modified in many ways to tailor it for use in a particular application. Modifications include calcination, ammonia calcinations, ion-exchange, steaming, various acid extractions, ammonium hexafluorosilicate treatment, or any combination thereof, as outlined for the case of UZM-4 in U.S. Pat. No. 6,776,975 B1 which is incorporated by reference in its entirety. In addition, properties that may be modified include porosity, adsorption, framework composition, acidity, thermal stability, ion-exchange capacity, etc.

As synthesized, the PST-19 material will contain some of the exchangeable or charge balancing cations in its pores. These exchangeable cations can be exchanged for other cations, or in the case of organic cations, they can be removed by heating under controlled conditions. Because PST-19 is a large pore material and the SBS structure has a 3-dimensional 12-ring pore system as well as some 8-ring pores, many organic cations may be removed directly by ion-exchange and heating may not be necessary. If heating is necessary to remove the organic cation from the pores, a preferred method is ammonia calcination. Calcination in air converts the organic cations in the pores to protons, which can lead to the loss of some metal, for example Al, from the framework upon exposure to ambient atmospheric water vapor. When the calcination is carried out in an ammonia atmosphere, the organic cation in the pore is replaced by $NH_4^+$ cation and the framework remains intact (See Studies in Surface Science, (2004) vol. 154, p. 1324-1331). Typical conditions for ammonia calcinations include the use of gaseous anhydrous ammonia flowing at a rate of 1.1 l/min while ramping the sample temperature at 5° C./min to 500° C. and holding at that temperature for a time ranging from 5 minutes to an hour. The resulting ammonium/alkali form of PST-19 has essentially the diffraction pattern of Table A. Once in this form, the ammonia calcined material may be ion-exchanged with $H^+$, $NH_4^+$, alkali metals, alkaline earth metals, transition metals, rare earth metals, or any mixture thereof, to achieve a wide variety of compositions with the PST-19 framework in superior condition.

When PST-19 or its modified forms are calcined in air, there can be a loss of metal from the framework, such as Al, which can alter the x-ray diffraction pattern from that observed for the as-synthesized PST-19 (See Studies in Surface Science, (2004) vol. 154, p. 1324-1331). Typical conditions for the calcination of the PST-19 sample include ramping the temperature from room temperature to a calcination temperature of 400-600° C., preferably a calcination temperature of 450-550° C. at a ramp rate of 1 to 5° C./min, preferably a ramp rate of 2 to 4° C./min, the temperature ramp conducted in an atmosphere consisting either of flowing nitrogen or flowing clean dry air, preferably an atmosphere of flowing nitrogen. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; preferably at the calcination temperature the calcination atmosphere will remain flowing nitrogen for a period of 1-10 hr and preferably for a period of 2-4 hours before converting the calcination atmosphere to flowing clean dry air. The final step of the calcination is a dwell at the calcination temperature in flowing clean dry air. Whether the calcination atmosphere during the initial temperature ramp was flowing nitrogen or flowing clean dry air, once at the calcination temperature and once the calcination atmosphere is flowing clean dry air, the PST-19 sample will spend a period of 1-24 hr and preferably a period of 2-6 hr under these conditions to complete the calcination process.

The crystalline PST-19 materials of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The PST-19 compositions of this invention can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. No. 4,310,440, U.S. Pat. No. 4,440,871 and U.S. Pat. No. 5,126,308, which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204-649° C.), preferably between 600° and 950° F. (316-510° C.). Reaction pressures are in the range of atmospheric to about 3,500 psig (24,132 kPa g), preferably between 200 and 3000 psig (1379-20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the PST-19 composition using feedstocks such as gas oils, heavy naphthas, deasphalted crude oil residua, etc. with gasoline being the principal desired product. Temperature conditions of 850° to 1100° F. (455° C. to 593° C.), LHSV values of 0.5 $hr^{-1}$ to 10 $hr^{-1}$ and pressure conditions of from about 0 to 50 psig (0-345 kPa) are suitable.

Alkylation of aromatics usually involves reacting an aromatic ($C_2$ to $C_{12}$), especially benzene, with a monoolefin to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig (1,379-6,895 kPa). Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 $hr^{-1}$ to about 120 $hr^{-1}$. Details on paraffin alkylation may be found in U.S. Pat. No. 5,157,196 and U.S. Pat. No. 5,157,197, which are incorporated by reference.

The conversion of methanol to olefins is effected by contacting the methanol with the PST-19 catalyst at conversion conditions, thereby forming the desired olefins. The methanol can be in the liquid or vapor phase with the vapor phase being preferred. Contacting the methanol with the PST-19 catalyst can be done in a continuous mode or a batch mode with a continuous mode being preferred. The amount of time that the methanol is in contact with the PST-19 catalyst must be sufficient to convert the methanol to the desired light olefin products. When the process is carried out in a batch process, the contact time varies from about 0.001 hrs to about 1 hr and preferably from about 0.01 hr to about 1.0 hr. The longer contact times are used at lower temperatures while shorter times are used at higher temperatures. Further, when the process is carried out in a continuous mode, the Weight Hourly Space Velocity (WHSV) based on methanol can vary from about 1 $hr^{-1}$ to about 1000 $hr^{-1}$ and preferably from about 1 $hr^{-1}$ to about 100 $hr^{-1}$.

Generally, the process must be carried out at elevated temperatures in order to form light olefins at a fast enough rate. Thus, the process should be carried out at a temperature of about 300° C. to about 600° C., preferably from about 400° C. to about 550° C. and most preferably from about 450° C. to about 525° C. The process may be carried out over a wide range of pressure including autogenous pressure. Thus, the pressure can vary from about 0 kPa (0 psig) to about 1724 kPa (250 psig) and preferably from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e.g., methane, aromatic hydrocarbons, e.g., benzene, toluene and mixtures thereof. The amount of diluent used can vary considerably and is usually from about 5 to about 90 mole percent of the feedstock and preferably from about 25 to about 75 mole percent.

The actual configuration of the reaction zone may be any well known catalyst reaction apparatus known in the art. Thus, a single reaction zone or a number of zones arranged in series or parallel may be used. In such reaction zones the methanol feedstock is flowed through a bed containing the PST-19 catalyst. When multiple reaction zones are used, one or more PST-19 catalysts may be used in series to produce the desired product mixture. Instead of a fixed bed, a dynamic bed system, e.g., fluidized or moving, may be used. Such a dynamic system would facilitate any regeneration of the PST-19 catalyst that may be required. If regeneration is required, the PST-19 catalyst can be continuously introduced as a moving bed to a regeneration zone where it can be regenerated by means such as oxidation in an oxygen containing atmosphere to remove carbonaceous materials.

The following examples are presented in illustration of this invention and are not intended as undue limitations on the generally broad scope of the invention as set out in the appended claims. The products of this invention are designated with the general name PST-19, with the understanding that all of the PST-19 materials exhibit a structure with the SBS topology.

The structure of the PST-19 compositions of this invention was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as:

$w$=0-15; $m$=15-60: $s$=60-80 and $vs$=80-100

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

Example 1

A Teflon beaker was charged with 120.00 g tetraethylammonium hydroxide (TEAOH, 35%), SACHEM Inc.) and placed under a high speed overhead stirrer. Pre-ground aluminum isopropoxide (13.3% Al, Sigma-Aldrich), 5.79 g, was dissolved in the TEAOH solution. This was followed by the fast dropwise addition of 19.57 g H$_3$PO$_4$ (85.7%). The reaction mixture was diluted with 37.65 g de-ionized water. Separately, a zinc acetate solution was prepared by dissolving 6.26 g Zn(OAc)$_2$*2H$_2$O in 35.00 g de-ionized water. This solution was added in a fast dropwise manner to the reaction mixture with vigorous stirring. Then a solution was prepared by dissolving 1.41 g potassium acetate, KOAc (99.4%), in 25.00 g de-ionized water. This solution was also added fast dropwise to the reaction mixture, resulting in a clear solution. The reaction mixture was distributed among 7 Teflon-lined autoclaves which were digested quiescently at 95, 125, 150 and 175° C. for either 59 or 159 hr or both at autogenous pressure. The solid products were isolated by centrifugation, washed with de-ionized water and dried at room temperature. The major product in every case was determined to be PST-19 by x-ray powder diffraction, with most of the reactions yielding products showing no impurities. Representative x-ray diffraction lines are listed for the PST-19 product resulting from the 125° C./159 hr reaction in table 1 below. Analysis by Scanning Electron Microscopy (SEM) showed the PST-19 product to consist of extremely thin plate crystals, with the plate face diameters ranging from about 0.3 to about 1μ across while plate thicknesses are on the order of 0.01 to about 0.1μ. Elemental analysis yielded the stoichiometry TEA$_{0.05}$K$_{0.33}$Al$_{0.51}$Zn$_{0.62}$P for the PST-19 product.

TABLE 1

| 2-Θ | d (Å) | I/I$_0$ (%) |
|---|---|---|
| 5.78 | 15.28 | w |
| 6.50 | 13.59 | vs |
| 10.00 | 8.83 | w |
| 11.94 | 7.40 | w |
| 13.14 | 6.73 | w |
| 15.32 | 5.78 | w |
| 15.60 | 5.68 | w |
| 16.53 | 5.36 | w |
| 20.04 | 4.43 | m |
| 20.94 | 4.24 | w |
| 21.98 | 4.04 | m |
| 22.14 | 4.01 | w |
| 23.98 | 3.71 | w |
| 25.78 | 3.45 | w |
| 26.66 | 3.34 | m |
| 27.78 | 3.21 | w |
| 28.24 | 3.16 | m |
| 29.14 | 3.06 | w |
| 31.20 | 2.86 | m |
| 35.20 | 2.55 | w |

Example 2

A Teflon beaker was charged with 928.44 g of Triethylpropylammonium hydroxide (TEPAOH, 19.7%, SACHEM Inc.) followed by the addition 27.96 g of aluminum tri-sec-butoxide (Sigma Aldrich, 97+%), which were then homogenized with a high speed overhead stirrer to make a clear solution. Then 78.50 g of H$_3$PO$_4$ (85%) was slowly added to the mixture. Separately, 24.91 g of Zn(OAc)$_2$*2H$_2$O was dissolved in 60 g de-ionized water and then was added dropwise to the reaction mixture with vigorous mixing. Similarly, 2.12 g of KCl was dissolved in 10.00 g de-ionized water and added dropwise to the stirring reaction mixture. The reaction mixture was further homogenized until it was a clear solution. A portion of the solution, 1050 g, was placed in a 2-L Teflon-lined PARR reactor and digested quiescently for 92 hours at 175° C. at autogenous pressure. The solid product was isolated by centrifugation, washed with de-ionized water and dried at room temperature. Characterization via powder x-ray diffraction showed that the product was PST-19 with the SBS topology. Representative diffraction lines observed for the product are provided below in table 2. FIG. 1 shows that analysis by SEM showed the product to consist of hexagonal plate crystals with dimensions across the face of the plate ranging from 0.2 to about 2μ, while the plate thickness is less than about 0.1μ. Elemental analysis yielded the stoichiometry TEPA$_{0.18}$K$_{0.22}$Zn$_{0.63}$Al$_{0.43}$P for the PST-19 product.

TABLE 2

| 2-Θ | d (Å) | I/I$_0$ (%) |
|---|---|---|
| 5.92 | 14.93 | w |
| 6.69 | 13.20 | vs |
| 10.15 | 8.71 | w |
| 11.40 | 7.76 | w |
| 11.68 | 7.57 | w |
| 12.10 | 7.31 | w |
| 13.22 | 6.69 | w |
| 15.43 | 5.74 | w |
| 15.77 | 5.61 | w |
| 16.62 | 5.33 | w |
| 18.70 | 4.74 | w |
| 20.22 | 4.39 | w |
| 21.06 | 4.22 | w |
| 21.97 | 4.04 | w |
| 22.21 | 4.00 | w |
| 24.13 | 3.69 | w |
| 25.71 | 3.46 | w |
| 25.85 | 3.44 | w |
| 26.46 | 3.37 | w |
| 26.77 | 3.33 | w |
| 28.38 | 3.14 | w |
| 29.29 | 3.05 | w |
| 29.92 | 2.98 | w |
| 30.44 | 2.93 | w |
| 31.35 | 2.85 | w |
| 32.83 | 2.73 | w |
| 35.32 | 2.54 | w |

Example 3

A Teflon beaker was charged with 81.72 g of Diethylmethylpropylammonium hydroxide (DEMPAOH, 20.7%, SACHEM Inc.) followed by the addition of 2.83 g of aluminum-tri-sec-butoxide (97+%), which were then homogenized with a high speed overhead stirrer to make a clear solution. Then 7.96 g of H$_3$PO$_4$ (85%) was slowly added to the mixture as stirring continued. Separately, 2.53 g of Zn(OAc)$_2$*2H$_2$O was dissolved in 8.00 g de-ionized water. This solution was added to the reaction mixture in a dropwise fashion. Next, a solution was prepared by dissolving 0.43 g KCl in 4.00 g de-ionized water. This solution was also added dropwise to the reaction mixture with vigorous stirring. The resulting clear solution was distributed among three Teflon-lined autoclaves that were digested for 48, 72, and 96 hr at 175° C., rotated in a rotisserie oven at autogenous pressure. The products were isolated by centrifugation, washed with de-ionized water, and dried at 100° C. The products were identified as PST-19 with the SBS topology by powder x-ray diffraction. Representative diffraction lines are shown for the products in Table 3A (48 hr product) and Table 3B (96 hr product). Elemental analysis on the product from the 48 hr digestion yielded the stoichiometry DEMPA$_{0.19}$K$_{0.26}$Al$_{0.45}$Zn$_{0.57}$P for the PST-19 product.

TABLE 3

| Table 3A | | | Table 3B | | |
|---|---|---|---|---|---|
| 2-Θ | d (Å) | $I/I_0$ (%) | 2-Θ | d (Å) | $I/I_0$ (%) |
| 5.85 | 15.09 | w | 5.93 | 14.88 | w |
| 6.51 | 13.56 | vs | 6.63 | 13.32 | vs |
| 10.08 | 8.77 | w | 10.13 | 8.73 | w |
| 11.66 | 7.58 | w | 11.71 | 7.55 | w |
| 12.02 | 7.36 | w | 12.11 | 7.30 | w |
| 13.08 | 6.77 | w | 13.20 | 6.70 | w |
| 15.37 | 5.76 | w | 15.49 | 5.72 | w |
| 15.69 | 5.64 | w | 15.75 | 5.62 | w |
| 16.49 | 5.37 | w | 16.61 | 5.33 | w |
| 18.64 | 4.76 | w | 18.70 | 4.74 | w |
| 20.14 | 4.41 | w | 20.22 | 4.39 | w |
| 20.46 | 4.34 | w | 21.11 | 4.20 | w |
| 21.00 | 4.23 | w | 21.95 | 4.05 | w |
| 21.94 | 4.05 | w | 24.15 | 3.68 | w |
| 24.05 | 3.70 | w | 25.84 | 3.44 | w |
| 25.67 | 3.47 | w | 26.40 | 3.37 | w |
| 26.34 | 3.38 | w | 26.82 | 3.32 | w |
| 26.72 | 3.33 | w | 27.66 | 3.22 | w |
| 27.72 | 3.22 | w | 28.34 | 3.15 | w |
| 28.22 | 3.16 | w | 29.30 | 3.05 | w |
| 29.22 | 3.05 | w | 29.91 | 2.98 | w |
| 29.84 | 2.99 | w | 30.47 | 2.93 | w |
| 30.45 | 2.93 | w | 31.33 | 2.85 | w |
| 31.23 | 2.86 | w | 35.34 | 2.54 | w |
| 35.22 | 2.55 | w | | | |

Example 4

A Teflon beaker was charged with 77.36 g of dimethylethylpropylammonium hydroxide (DMEPAOH, SACHEM Inc., 20.0%) and placed under a high-speed overhead stirrer. Then 2.87 g aluminum tri-sec-butoxide (97+%) was added with stirring, easily dissolving within minutes. This was followed by the dropwise addition of 8.05 g of $H_3PO_4$ (85%). Separately, $Zn(OAc)_2 \cdot 2H_2O$, 2.55 g, was dissolved in 8.00 g de-ionized water. This solution was added dropwise to the stirring reaction mixture. Next, KCl, 0.43 g, was dissolved in 4.00 g de-ionized water and added dropwise with continued stirring. Continued homogenization of the reaction mixture produced a clear solution. The final reaction mixture was distributed among (3) Teflon-lined autoclaves and digested for periods of 48, 72 and 96 hr at 175° C., rotated in a rotisserie oven at autogenous pressure. The products were isolated by centrifugation, washed with de-ionized water and dried at 100° C. The products were identified as PST-19 with the SBS topology via powder x-ray diffraction. Representative diffraction lines are given for the products from the 48 and 96 hr digestions in Tables 4A and 4B, respectively. Elemental analysis on the product digested for 48 hr yielded the stoichiometry $DMEPA_{0.20}K_{0.31}Zn_{0.58}Al_{0.44}P$ for the PST-19 product.

TABLE 4

| Table 4A | | | Table 4B | | |
|---|---|---|---|---|---|
| 2-Θ | d (Å) | $I/I_0$ (%) | 2-Θ | d (Å) | $I/I_0$ (%) |
| 5.81 | 15.20 | w | 5.89 | 14.99 | m |
| 6.47 | 13.65 | vs | 6.55 | 13.48 | vs |
| 10.01 | 8.83 | w | 10.12 | 8.73 | w |
| 11.61 | 7.61 | w | 11.66 | 7.58 | w |
| 11.96 | 7.40 | w | 12.04 | 7.35 | w |
| 13.10 | 6.76 | w | 13.08 | 6.77 | w |
| 15.31 | 5.78 | w | 13.41 | 6.60 | w |
| 15.65 | 5.66 | w | 15.41 | 5.75 | w |
| 16.51 | 5.37 | w | 15.77 | 5.62 | w |
| 18.60 | 4.77 | w | 16.59 | 5.34 | w |
| 20.08 | 4.42 | w | 18.68 | 4.75 | w |
| 20.80 | 4.27 | w | 20.18 | 4.40 | w |
| 21.99 | 4.04 | w | 20.61 | 4.31 | w |
| 23.21 | 3.83 | w | 21.02 | 4.22 | w |
| 23.97 | 3.71 | w | 21.88 | 4.06 | w |
| 25.58 | 3.48 | w | 24.11 | 3.69 | w |
| 26.78 | 3.33 | w | 25.67 | 3.47 | w |
| 28.18 | 3.16 | w | 26.80 | 3.32 | w |
| 29.17 | 3.06 | w | 27.64 | 3.22 | w |
| 31.17 | 2.87 | w | 28.32 | 3.15 | w |
| 35.24 | 2.54 | w | 29.26 | 3.05 | w |
| | | | 30.39 | 2.94 | w |
| | | | 31.15 | 2.87 | w |
| | | | 31.37 | 2.85 | w |
| | | | 32.83 | 2.73 | w |
| | | | 34.76 | 2.58 | w |
| | | | 35.23 | 2.55 | w |

The invention claimed is:

1. A microporous crystalline metallophosphate material having a three-dimensional framework of $[M^{2+}O_{4/2}]^{2-}$, $[EO_{4/2}]^-$ and $[PO_{4/2}]^+$ and tetrahedral units and an empirical composition in the as synthesized form and on an anhydrous basis expressed by an empirical formula of:

$$R^{p+}_r A^+_m M^{2+}_x E_y PO_z$$

where R is at least one quaternary ammonium cation selected from the group consisting of tetraethylammonium (TEA$^+$), triethylpropylammonium (TEPA$^+$), diethylmethylpropylammonium (DEMPA$^+$), dimethylethylpropylammonium (DMEPA$^+$), dimethyldipropylammonium (DMDPA$^+$), methyltriethylammonium (MTEA$^+$), ethyltrimethylammonium (ETMA$^+$), diethyldimethylammonium (DEDMA$^+$), choline, hexamethonium (HM$^{2+}$), propyltrimethylammonium (PTMA$^+$), butyltrimethylammonium (BTMA$^+$), hexamethonium (HM$^{2+}$), tetramethylammonium (TMA$^+$), tetrapropylammonium (TPA$^+$) and mixtures thereof, "r" is the mole ratio of R to P and has a value of about 0.04 to about 1.0, "p" is the weighted average valence of R and varies from 1 to 2, A is an alkali metal selected from the group consisting of Li$^+$, Na$^+$, K$^+$, Rb$^+$ and Cs$^+$ and mixtures thereof, "m" is the mole ratio of A to P and varies from 0.1 to 1.0, M is a divalent element selected from the group of Zn, Mg, Co, Mn and mixtures thereof, "x" is the mole ratio of M to P and varies from 0.2 to about 0.9, E is a trivalent element selected from the group consisting of aluminum and gallium and mixtures thereof, "y" is the mole ratio of E to P and varies from 0.1 to about 0.8 and "z" is the mole ratio of O to P and has a value determined by the equation:

$$z=(m+p \cdot r+2 \cdot x+3 \cdot y+5)/2$$

and is characterized in that it has the x-ray diffraction pattern having at least the d-spacings and intensities set forth in Table A:

TABLE A

| 2Θ | d (Å) | $I/I_0$ % |
|---|---|---|
| 6.01-5.72 | 14.70-15.45 | w-m |
| 6.80-6.37 | 12.98-13.87 | vs |
| 10.22-9.94 | 8.65-8.89 | w |

TABLE A-continued

| 2Θ | d (Å) | I/I₀ % |
|---|---|---|
| 12.22-11.87 | 7.24-7.45 | w |
| 13.30-12.99 | 6.65-6.81 | w |
| 15.62-15.18 | 5.67-5.83 | w |
| 15.86-15.52 | 5.585-5.705 | w |
| 16.75-16.40 | 5.29-5.40 | w |
| 20.35-19.89 | 4.36-4.46 | w-m |
| 21.29-20.69 | 4.17-4.29 | w |
| 22.09-21.77 | 4.02-4.08 | w-m |
| 24.30-23.84 | 3.66-3.73 | w |
| 37.12-25.43 | 2.42-3.50 | w-m |
| 27.00-26.51 | 3.30-3.36 | w-m |
| 28.59-28.22 | 3.12-3.16 | w-m |
| 29.46-28.97 | 3.03-3.08 | w-m |
| 31.48-31.03 | 2.84-2.88 | w-m |
| 35.52-35.02 | 2.525-2.56 | w. |

2. The metallophosphate material of claim 1 where E is aluminum.

3. The metallophosphate material of claim 1 where R is tetraethylammonium cation, TEA⁺.

4. The metallophosphate material of claim 1 where R is the triethylpropylammonium cation, TEPA⁺.

5. The metallophosphate material of claim 1 where R is the diethylmethylpropylammonium cation, DEMPA⁺.

6. The metallophosphate material of claim 1 where R is the dimethylethylpropylammonium cation, DMEPA⁺.

7. The metallophosphate material of claim 1 where R is the methyltriethylammonium cation, MTEA⁺.

8. The metallophosphate material of claim 1 where R is the dimethyldipropylammonium cation, DMDPA⁺.

9. The metallophosphate material of claim 1 with crystal dimensions less than about 5 microns and preferably less than 3 microns and more preferably less than 2 microns.

10. A process for preparing a microporous crystalline metallophosphate material having a three-dimensional framework of $[M^{2+}O_{4/2}]^{2-}$, $[EO_{4/2}]^-$ and $[PO_{4/2}]^+$ tetrahedral units and an empirical composition in the as synthesized form and on an anhydrous basis expressed by an empirical formula of:

$$R^{p+}_r A^+_m M^{2+}_x E_y PO_z$$

where R is at least one organoammonium cation selected from the group consisting of tetraethylammonium (TEA⁺), triethylpropylammonium (TEPA⁺), diethylmethylpropylammonium (DEMPA⁺), dimethylethylpropylammonium (DMEPA⁺), dimethyldipropylammonium (DMDPA⁺), methyltriethylammonium (MTEA⁺), ethyltrimethylammonium (ETMA⁺), diethyldimethylammonium (DEDMA⁺), choline, hexamethonium (HM²⁺), propyltrimethylammonium (PTMA⁺), butyltrimethylammonium (BTMA⁺), hexamethonium (HM²⁺), tetramethylammonium (TMA⁺), tetrapropylammonium (TPA⁺) and mixtures thereof, "r" is the mole ratio of R to P and has a value of about 0.04 to about 1.0, "p" is the weighted average valence of R and varies from 1 to 2, A is an alkali metal selected from the group consisting of Li⁺, Na⁺, K⁺, Rb⁺ and Cs⁺ and mixtures thereof, "m" is the mole ratio of A to P and varies from 0.1 to 1.0, M is a divalent element selected from the group of Zn, Mg, Co, Mn and mixtures thereof, "x" is the mole ratio of M to P and varies from 0.2 to about 0.9, E is a trivalent element selected from the group consisting of aluminum and gallium and mixtures thereof, "y" is the mole ratio of E to P and varies from 0.1 to about 0.8 and "z" is the mole ratio of O to P and has a value determined by the equation:

$$z = (m + p \cdot r + 2 \cdot x + 3 \cdot y + 5)/2$$

and is characterized in that it has the x-ray diffraction pattern having at least the d-spacings and intensities set forth in Table A:

TABLE A

| 2Θ | d (Å) | I/I₀ % |
|---|---|---|
| 6.01-5.72 | 14.70-15.45 | w-m |
| 6.80-6.37 | 12.98-13.87 | vs |
| 10.22-9.94 | 8.65-8.89 | w |
| 12.22-11.87 | 7.24-7.45 | w |
| 13.30-12.99 | 6.65-6.81 | w |
| 15.62-15.18 | 5.67-5.83 | w |
| 15.86-15.52 | 5.585-5.705 | w |
| 16.75-16.40 | 5.29-5.40 | w |
| 20.35-19.89 | 4.36-4.46 | w-m |
| 21.29-20.69 | 4.17-4.29 | w |
| 22.09-21.77 | 4.02-4.08 | w-m |
| 24.30-23.84 | 3.66-3.73 | w |
| 37.12-25.43 | 2.42-3.50 | w-m |
| 27.00-26.51 | 3.30-3.36 | w-m |
| 28.59-28.22 | 3.12-3.16 | w-m |
| 29.46-28.97 | 3.03-3.08 | w-m |
| 31.48-31.03 | 2.84-2.88 | w-m |
| 35.52-35.02 | 2.525-2.56 | w | the process comprising forming a reaction mixture containing reactive sources of R, A, E, M and P, and heating the reaction mixture at a temperature of about 60° C. to about 200° C. for a time sufficient to form the metallophosphate molecular sieve, the reaction mixture having a composition expressed in terms of mole ratios of the oxides of:

$$aR_{2/p}O : bA_2O : cMO : E_2O_3 : dP_2O_5 : eH_2O$$

where "a" has a value of about 2.1 to about 100, "b" has a value of about 0.1 to about 8.0, "c" has a value of about 0.25 to about 8, "d" has a value of about 1.69 to about 25, and "e" has a value from 30 to 5000.

11. The process of claim 10 where the initial reaction mixture is a clear solution before digestion.

12. The process of claim 10 where A is selected from the group consisting of Li⁺, Na⁺, K⁺, Rb⁺ and Cs⁺ and mixtures thereof and the source of A is selected from the group consisting of halide salts, nitrate salts, acetate salts, sulfate salts, hydroxide salts and mixtures thereof.

13. The process of claim 10 where M is selected from the group consisting of Zn²⁺, Mn²⁺, Co²⁺ and Mg²⁺ and mixtures thereof and the source of M is selected from the group consisting of halide salts, nitrate salts, acetate salts, sulfate salts and mixtures thereof.

14. The process of claim 10 where the source of E is selected from the group consisting of aluminum isopropoxide, aluminum sec-butoxide, precipitated alumina, Al(OH)₃, alkali aluminate salts, aluminum metal, aluminum halide salts, aluminum sulfate salts, aluminum nitrate salts, precipitated gallium oxyhydroxide, gallium nitrate, gallium sulfate and mixtures thereof.

15. The process of claim 10 where the reaction mixture is reacted at a temperature of about 95° C. to about 175° C. for a time of about 1 day to about 14 days.

16. The process of claim 10 where R is tetraethylammonium, TEA⁺, triethylpropylammonium, TEPA⁺, diethylmethylpropylammonium, DEMPA⁺, dimethylethylpropylammonium, DMEPA⁺, dimethyldipropylammonium, DMDPA⁺ or methyltriethylammonium, MTEA⁺ and mixtures thereof.

* * * * *